United States Patent
Arbel

(10) Patent No.: US 9,721,528 B2
(45) Date of Patent: Aug. 1, 2017

(54) PROCESSING SYSTEM DISPLAY CONTROLLER INTERFACE TO PROGRAMMABLE LOGIC

(71) Applicant: Xilinx, Inc., San Jose, CA (US)

(72) Inventor: Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 331 days.

(21) Appl. No.: 14/537,770

(22) Filed: Nov. 10, 2014

(65) Prior Publication Data

US 2016/0133225 A1    May 12, 2016

(51) Int. Cl.
*G09G 5/00* (2006.01)
*G09G 5/36* (2006.01)
*G06F 3/14* (2006.01)

(52) U.S. Cl.
CPC ............ *G09G 5/006* (2013.01); *G09G 5/36* (2013.01); *G06F 3/1431* (2013.01); *G09G 5/363* (2013.01); *G09G 2370/10* (2013.01); *G09G 2370/12* (2013.01)

(58) Field of Classification Search
CPC ............ G06F 3/1431; G09G 2370/10; G09G 2370/12; G09G 5/006; G09G 5/36; G09G 5/363
See application file for complete search history.

(56) References Cited

U.S. PATENT DOCUMENTS

| | | | | |
|---|---|---|---|---|
| 8,554,953 B1* | 10/2013 | Sorensen | ................. | A61B 7/00 710/2 |
| 2003/0128197 A1* | 7/2003 | Turner | ................. | G06F 3/1423 345/204 |
| 2004/0232942 A1* | 11/2004 | Kundu | ............... | G06F 15/7867 326/39 |
| 2005/0073608 A1* | 4/2005 | Stone | ....................... | H04N 7/08 348/468 |
| 2005/0206609 A1* | 9/2005 | Yamamoto | ............... | G09G 3/20 345/104 |
| 2007/0120949 A1* | 5/2007 | Chuang | .................... | H04N 7/14 348/14.01 |
| 2009/0051622 A1* | 2/2009 | Yun | ....................... | G06F 3/1431 345/2.1 |
| 2010/0103180 A1* | 4/2010 | Tamaoki | .................. | G06T 1/20 345/522 |
| 2010/0295870 A1* | 11/2010 | Baghdadi | ............... | G09G 5/005 345/650 |
| 2012/0176295 A1* | 7/2012 | Lee | ...................... | G06F 1/1601 345/1.3 |
| 2014/0267316 A1* | 9/2014 | Connell | .................... | G06T 1/20 345/503 |
| 2016/0196804 A1* | 7/2016 | Skinner | ............... | H04N 19/124 345/543 |

* cited by examiner

*Primary Examiner* — Sultana M Zalalee
(74) *Attorney, Agent, or Firm* — Robert M. Brush; Keith Taboada

(57) ABSTRACT

In an example, a programmable integrated circuit (IC) includes programmable logic and a display controller. The display controller includes a first interface coupled to receive coded data, a renderer to generate display-agnostic data from the coded data, a transmitter to generate display data from the display-agnostic data in accordance with a first protocol, a second interface coupled to provide the display data as output, and a third interface coupled to provide the display-agnostic data to the programmable logic.

20 Claims, 5 Drawing Sheets

PROCESSING SYSTEM DISPLAY CONTROLLER INTERFACE TO PROGRAMMABLE LOGIC

TECHNICAL FIELD

Examples of the present disclosure generally relate to electronic circuits and, in particular, to providing an interface within a programmable integrated circuit (IC) between a display controller in a processing system and programmable logic.

BACKGROUND

Programmable integrated circuits (ICs) include programmable logic that can be configured to implement circuits according to user input. Example programmable ICs include field programmable gate arrays (FPGAs), complex programmable logic devices (CPLDs), and the like. Advancement in system-on-chip (SoC) technology has led to programmable ICs that include both an embedded processing system and programmable logic. The embedded processing system can include microprocessor(s), on-chip memory, and various peripherals. Each peripheral in the embedded processing system includes a dedicated circuit to perform a particular function, such as a display controller, network controller, universal serial bus (USB) controller, and the like. Unlike the programmable logic, the ability to configure peripherals in the embedded processing system with different functionality is limited. For example, a display controller provides output according to a particular protocol for which it was designed and cannot be configured to provide output according to a different protocol. This limits the flexibility of the programmable IC.

SUMMARY

Techniques are described for providing an interface within a programmable integrated circuit (IC) between a display controller in an embedded processing system ("processing system") and programmable logic. In an example, a programmable IC includes programmable logic and a display controller. The display controller includes a first interface coupled to receive coded data, a renderer to generate display-agnostic data from the coded data, a transmitter to generate display data from the display-agnostic data in accordance with a first protocol, a second interface coupled to provide the display data as output, and a third interface coupled to provide the display-agnostic data to the programmable logic.

In another example, a system comprises a first display sink to receive first display data formatted in accordance with a first protocol, and a programmable integrate IC coupled to the first display sink. The programmable IC includes programmable logic, a display controller, and input/output (IO) circuits. The display controller includes a first interface coupled to receive coded data, a renderer to generate display-agnostic data from the coded data, a first transmitter to generate the first display data from the display-agnostic data, a second interface coupled to provide the first display data as output, and a third interface coupled to provide the display-agnostic data to the programmable logic. The IO circuits are coupled to the second interface of the display controller to provide the first display data to the first display sink.

In another example, a method includes: receiving coded data at a first interface of a display controller in processing system of a programmable IC; generating display-agnostic data from the coded data; generating display data formatted in accordance with a first protocol from the display-agnostic data; providing the display data as output at a second interface of the display controller; and providing the display-agnostic data as output to programmable logic of the programmable IC at a third interface of the display controller.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Techniques are described for providing an interface within a programmable integrated circuit (IC) between a display controller in an embedded processing system ("processing system") and programmable logic. The processing system generally includes at least one microprocessor and at least one peripheral including a display controller. The display controller is coupled to interconnect in the processing system, which allows the display controller to communicate with the microprocessor(s) and other circuits (e.g., memory), as well as the programmable logic. The display controller includes a first interface to receive coded data, a renderer to generate display-agnostic data from the coded data, a transmitter to generate display data formatted in accordance with a first protocol from the display-agnostic data, a second interface to provide the display data as output, and a third interface to provide the display-agnostic data to the programmable logic.

The display-agnostic data is obtained directly from the renderer in the display controller and is not formatted in accordance with any particular display protocol. The programmable logic can receive the display-agnostic data from the third interface of the display controller for further processing. For example, the programmable logic can be configured to implement a circuit that generates additional display data formatted in accordance with a second protocol different than the first protocol from the display-agnostic data. In this manner, the programmable logic has direct access to display-agnostic data generated by the renderer in the display controller, which provides for more flexibility. These and further aspects are discussed below with reference to the following figures.

Figure 1:
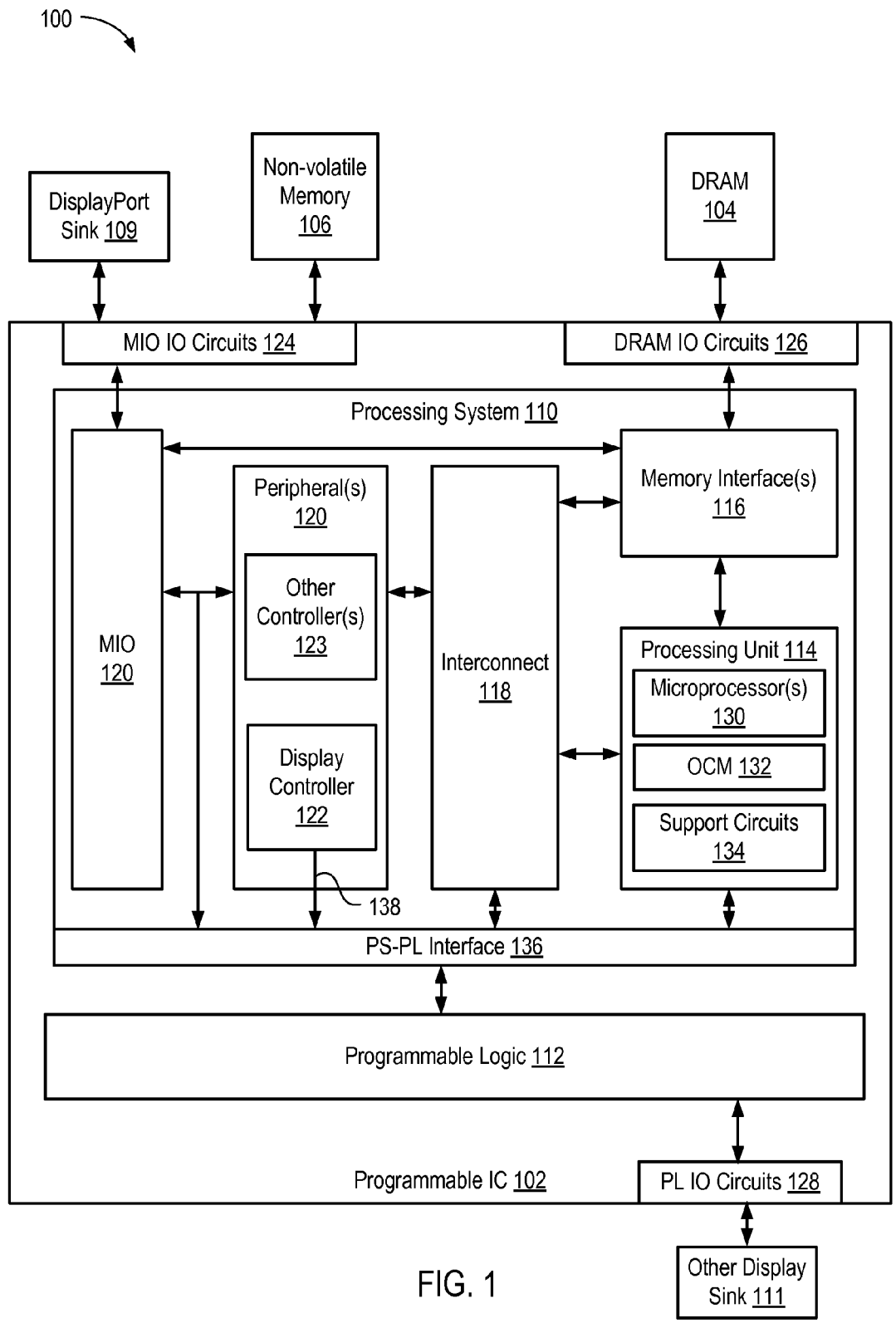
FIG. 1 is a block diagram depicting an example programmable system.

Turning now to the figures, FIG. 1 is a block diagram depicting an example programmable system 100. The programmable system 100 includes a programmable integrated circuit (IC) 102 coupled to various circuits, such as a dynamic random access memory (DRAM) 104, non-volatile memory 106, DisplayPort sink 109, and other display sink 111. The DRAM 104 can include various types of volatile memory circuits, such as synchronous DRAM, double data rate synchronous DRAM, and the like. The non-volatile memory 106 can include various types of non-volatile memory circuits, such as FLASH memory, electrically erasable programmable read only memory (EEPROM), and the like. The DisplayPort sink 109 comprises a circuit that processes display data formatted in accordance with a version of the DisplayPort protocol as defined by the Video Electronics Standards Association (VESA). The other display sink 111 comprises a circuit that processes display data formatted in accordance with another protocol, such as versions of the high-definition multimedia interface (HDMI), versions of the digital visual interface (DVI), or the like.

The programmable IC 102 can include a processing system 110 and programmable logic 112. The programmable IC 102 can include a system on chip (SoC) that integrates a microprocessor-based processing system with programmable logic of a field programmable gate array (FPGA), complex programmable logic device (CPLD), or the like. The processing system 110 can be coupled to various input/output (IO) circuits of the programmable IC 102, including multiplexed IO (MIO) circuits 124 and DRAM IO circuits 126. The DisplayPort sink 109 can be coupled to the MIO IO circuits 124, and the DRAM 104 can be coupled to the DRAM IO circuits 126. The programmable logic 112 can be coupled to programmable logic (PL) IO circuits 128. The other display sink 111 can be coupled to the PL IO circuits 128.

The processing system 110 can include a processing unit 114, one or more memory interfaces (memory interface(s) 116), interconnect 118, one or more peripherals (peripheral(s) 120), an MIO circuit (MIO 120), and a PS-PL interface 136, among other components. The processing unit 114 can be coupled to the memory interface(s) 116. The memory interface(s) 116 can include DRAM memory controllers, non-volatile memory controllers, and the like. The memory interface(s) 116 can be coupled the DRAM IO circuits 126 to communicate with the DRAM 104. The processing unit 114, the memory interface(s) 116, and the peripheral(s) 120 can be coupled to the interconnect 118. The peripheral(s) 120 and the memory interface(s) 116 can also be coupled to the MIO 120, which is in turn coupled to the MIO IO circuits 124. The peripheral(s) 120 can communicate with other circuits through the MIO 120 and the MIO IO circuits 124. The memory interface(s) 116 can communicate with the non-volatile memory 106 through the MIO 120 and the MIO IO circuits 124. The MIO 120 multiplexes interfaces of the peripheral(s) 120 and the memory interface(s) 116 among the MIO IO circuits 124. The peripheral(s) 120, the interconnect 118, and the processing unit 114 can be coupled to the PS-PL interface 136 for communicating with the programmable logic 112.

The processing unit 114 includes one or more microprocessors (microprocessor(s) 130), on-chip memory (OCM) 132, and support circuits 134. The microprocessor(s) 130 can include any type of microprocessors known in the art. The OCM 132 can include cache memory, local memory, or the like. The support circuits 134 can include various types of circuits, such as interrupt controller(s), direct memory access (DMA) controllers, timers, registers, interconnect, cache controllers, and the like.

Figure 2:
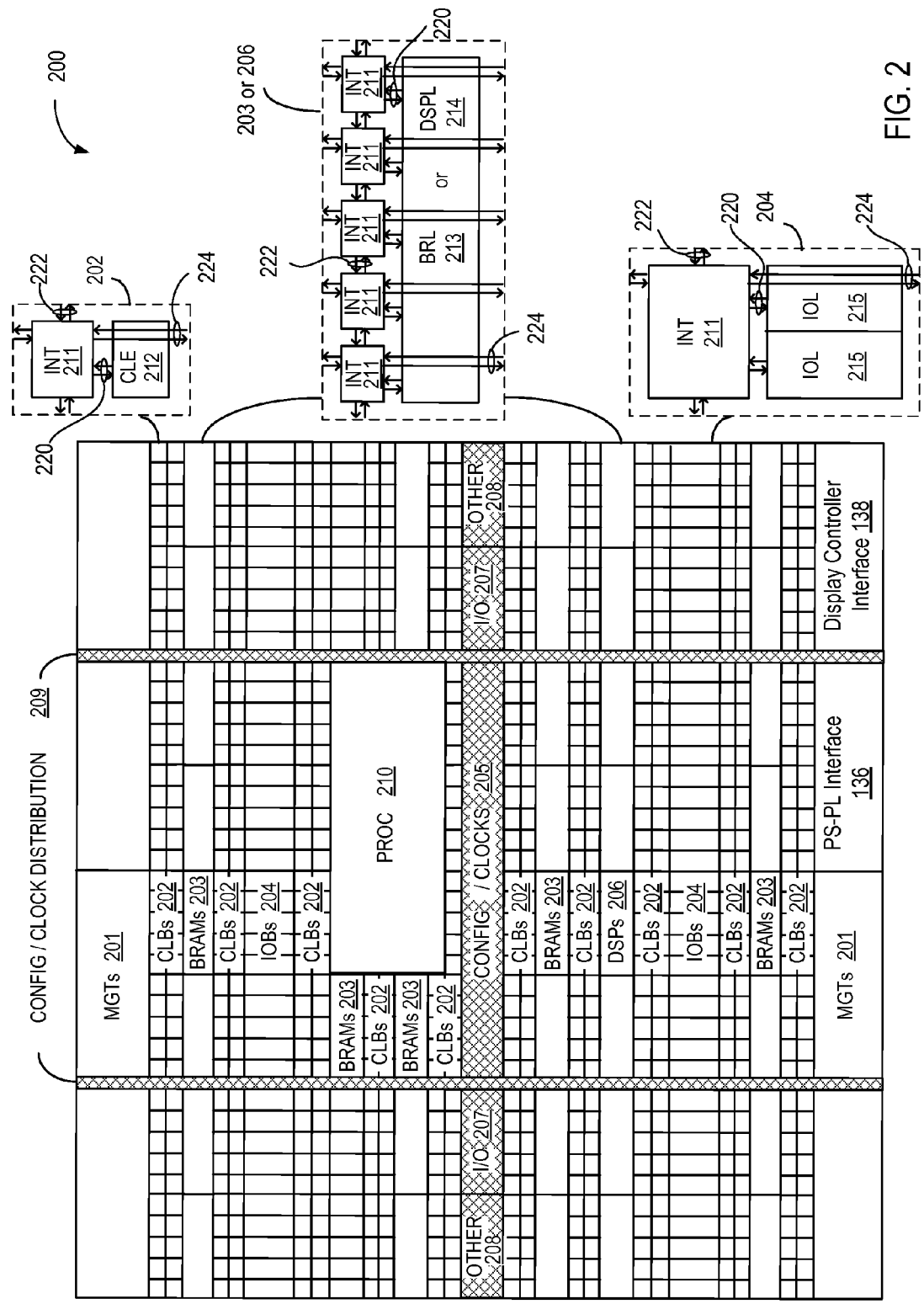
FIG. 2 illustrates an example of a field programmable gate array (FPGA) that can be used as programmable logic in the programmable system of FIG. 1.

The processing system 110 (PS) is coupled to the programmable logic 112 (PL) through the PS-PL interface 136. An example of the programmable logic 112 is shown in FIG. 2 and described below. The programmable logic 112 can communicate with the processing unit 114, the memory interface(s) 116, and the peripheral(s) 120 of the processing system 110. For example, the programmable logic 112 can interrupt the processing unit 114, access memory through the memory interface(s) 116 or within the processing unit 114, and access IO interfaces of the peripheral(s) 120.

In an example, the peripheral(s) 120 include a display controller 122 and optionally other controller(s) 123. The other controller(s) 123 can include, for example, universal serial bus (USB) controller(s), network controller(s), non-volatile memory controller(s), serial bus controller(s), and the like. The display controller 122 generates display data formatted in accordance with a first protocol. In the present example, the first protocol is a version of the DisplayPort protocol. The display data can include pixel data for displaying image(s) on a display. The display data can also include audio data in combination with the pixel data. The display controller 122 can provide the display data to the DisplayPort sink 109 through the MIO 120 and MIO IO circuits 124.

In general, the display controller 122 receives coded data as input, generates display-agnostic data from the coded data, and generates the display data from the display-agnostic data. The coded data can include video data, audio data, graphics data (i.e., still images), or a combination thereof. The coded data can be encoded using any well-known video, audio, or image coding standard, such as moving picture experts group (MPEG) standards, joint photographic experts group (JPEG) standards, and the like. The display controller 122 can render the coded data to generate the display-agnostic data. For example, the display controller 122 can multiplex video streams, multiplex audio streams, multiplex video with audio, blend graphics with video, transcode video or audio streams, or the like. In an example, the display-agnostic data comprises some transformation of the coded data. The transformation(s) applied to the coded data can be made to meet the input requirements of the particular protocol used to generate the output stream (e.g., the DisplayPort protocol in the present example). In another example, the display-agnostic data can include all or a portion of the coded data without any transformation (e.g., some or all of the video, audio, or graphics data can be pre-rendered).

In an example, the display controller 122 includes an interface 138 to the programmable logic 112. The display controller 122 outputs the display-agnostic data via the interface 138. The programmable logic 112 can receive the display-agnostic data and generate display data formatted using a protocol different than the protocol used by the display controller 122. For example, the display controller 122 can implement the DisplayPort protocol for its display data, and the programmable logic 112 can receive the display-agnostic data to generate display data formatted using the HDMI protocol or DVI protocol. The programmable logic 112 can generate display data from the display-agnostic data, which can be provided to the other display sink 111. In another example, the programmable logic 112 can provide the display-agnostic data to an external circuit (not shown), which can generate display data for a display sink.

FIG. 2 illustrates an example of a field programmable gate array (FPGA) 200 that can be used as the programmable logic 112. The FPGA 200 includes a programmable fabric that includes a large number of different programmable tiles including multi-gigabit transceivers ("MGTs") 201, configurable logic blocks ("CLBs") 202, random access memory blocks ("BRAMs") 203, input/output blocks ("IOBs") 204, configuration and clocking logic ("CONFIG/CLOCKS") 205, digital signal processing blocks ("DSPs") 206, specialized input/output blocks ("I/O") 207 (e.g., configuration ports and clock ports), and other programmable logic 208 such as digital clock managers, analog-to-digital converters, system monitoring logic, and so forth. Some FPGAs also include dedicated processor blocks ("PROC") 210.

In some FPGAs, each programmable tile can include at least one programmable interconnect element ("INT") 211 having connections to input and output terminals 220 of a programmable logic element within the same tile, as shown by examples included at the top of FIG. 2. Each programmable interconnect element 211 can also include connections to interconnect segments 222 of adjacent programmable interconnect element(s) in the same tile or other tile(s). Each programmable interconnect element 211 can also include connections to interconnect segments 224 of general routing resources between logic blocks (not shown). The general routing resources can include routing channels between logic blocks (not shown) comprising tracks of interconnect segments (e.g., interconnect segments 224) and switch blocks (not shown) for connecting interconnect segments. The interconnect segments of the general routing resources (e.g., interconnect segments 224) can span one or more logic blocks. The programmable interconnect elements 211 taken together with the general routing resources implement a programmable interconnect structure ("programmable interconnect") for the illustrated FPGA. Each programmable interconnect element 211 can include an interconnect circuit that can implement various types of switching among input interconnect segments and output interconnect segments, such as cross-point switching, breakpoint switching, multiplexed switching, and the like.

In an example, a CLB 202 can include a configurable logic element ("CLE") 212 that can be programmed to implement user logic plus a single programmable interconnect element ("INT") 211. A BRAM 203 can include a BRAM logic element ("BRL") 213 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 206 can include a DSP logic element ("DSPL") 214 in addition to an appropriate number of programmable interconnect elements. An IOB 204 can include, for example, two instances of an input/output logic element ("IOL") 215 in addition to one instance of the programmable interconnect element 211. As will be clear to those of skill in the art, the actual I/O pads connected, for example, to the I/O logic element 215 typically are not confined to the area of the input/output logic element 215.

In the pictured example, a horizontal area near the center of the die (shown in FIG. 2) is used for configuration, clock, and other control logic. Vertical columns 209 extending from this horizontal area or column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, processor block 210 spans several columns of CLBs and BRAMs. The processor block 210 can include one or more hard microprocessors and/or one or more soft microprocessors.

The FPGA 200 also includes the PS-PL interface 136, which includes the interface 138 to the display controller 122 for receiving display-agnostic data. The interface 138 can be coupled to the routing resources described above, allowing circuit(s) configured in the FPGA 200 to access the display-agnostic data generated by the display controller 122.

Note that FIG. 2 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 2 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. Moreover, the FPGA of FIG. 2 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

Figure 3:
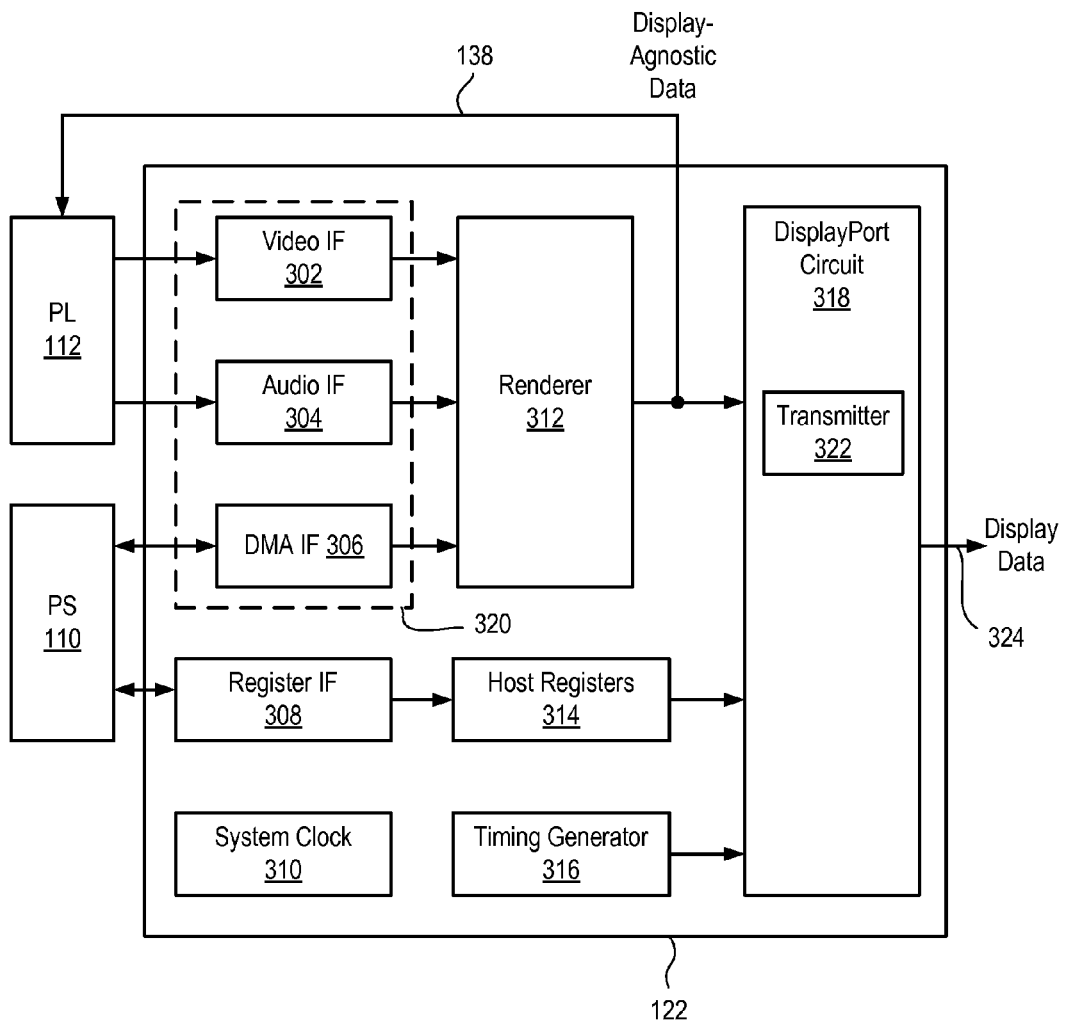
FIG. 3 is a block diagram shown an example of a display controller.

FIG. 3 is a block diagram shown an example of the display controller 122. The display controller 122 comprises an interface 320, a renderer 312, and a DisplayPort circuit 318. The display controller 122 can include other supporting circuits, such as register interface (IF) 308, host registers 314, system clock 310, and timing generator 316. The interface 320 includes a video IF 302, an audio IF 304, and a DMA IF 306. The interface 320 is coupled to the programmable logic 112 to receive coded data. For example, the video IF is coupled to the programmable logic 112 to receive video data and the audio IF 304 is coupled to the programmable logic 112 to receive audio data. The interface 320 can also be coupled to the processing system 110 to receive coded data. For example, the DMA IF 306 is coupled to the processing system 110 to receive graphics data from memory using DMA. The register IF 308 is also coupled to the processing system 110 to provide access to the host registers 314. The host registers 314 can store various data for controlling operation of the DisplayPort circuit 318. The system clock 310 can provide clock signal(s) to digital logic of the display controller 122. The timing generator 316 can generate video and audio timing signals for use by the DisplayPort circuit 318, such as vertical sync, horizontal sync, and the like. The renderer 312 generates display-agnostic data from coded data provided by the interface 320. The DisplayPort circuit 318 generates display data from the display-agnostic data. The DisplayPort circuit 318 can include a transmitter 322 to generate and transmit the display data via an output interface 324. The renderer 312 is also coupled to the programmable logic 112 through the interface 138 to provide the display-agnostic data.

Figure 4:
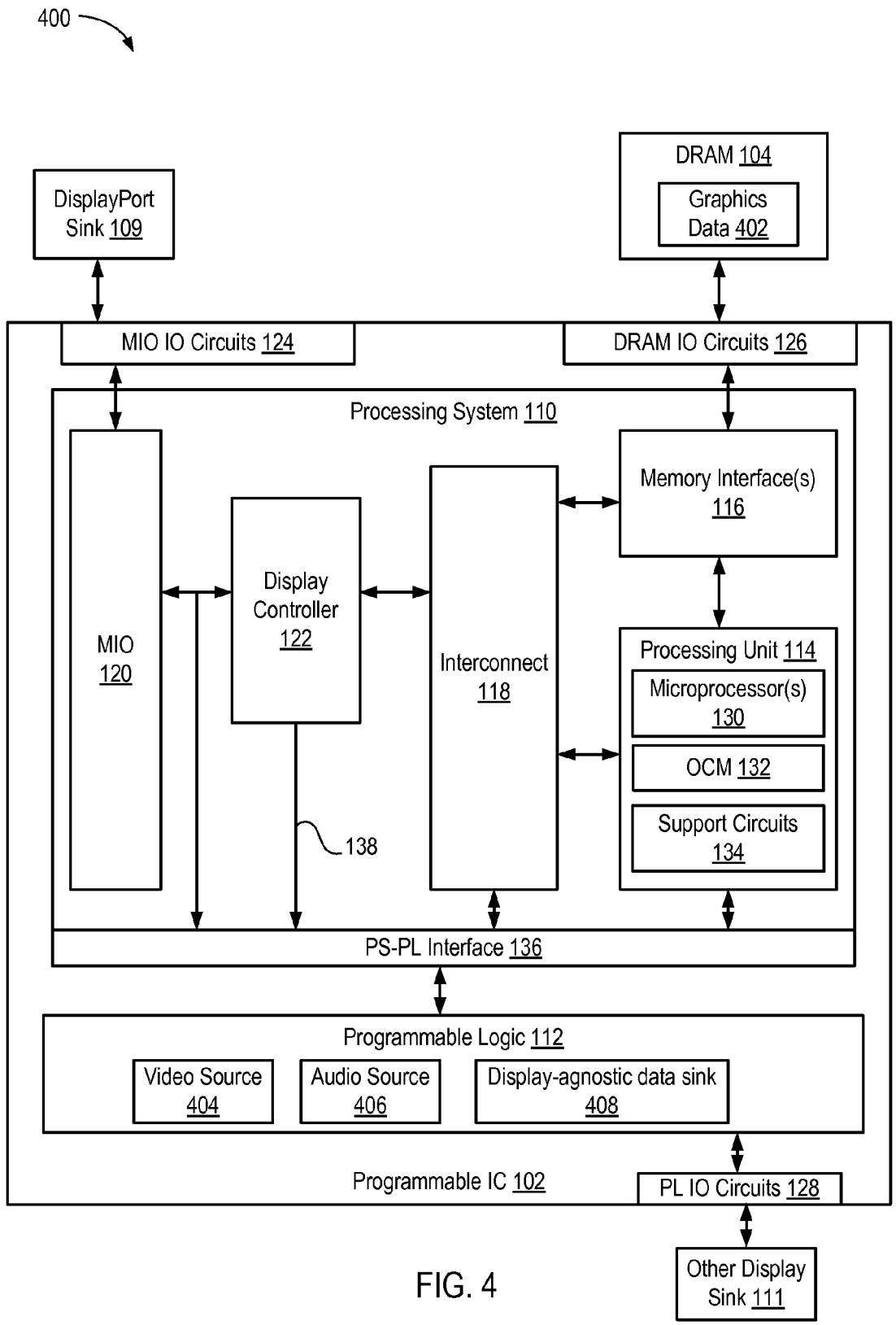
FIG. 4 is a block diagram showing an example configuration of the programmable system of FIG. 1.

FIG. 4 is a block diagram showing an example configuration 400 of the programmable system 100 of FIG. 1. In the example, the programmable logic 112 is configured with a video source 404, an audio source 406, and a display-agnostic data sink circuit 408. The processing system 110 is booted and used to store graphics data 402 in the DRAM 104. The display controller 122 can receive video data from the video source 404 through the PS-PL interface 136 and the interconnect 118. The display controller 122 can receive audio data from the audio source 406 through the PS-PL interface 136 and the interconnect 118. The display controller 122 can receive the graphics data 402 from the DRAM 104 using DMA through the interconnect 118 and the memory interface(s) 116. The display controller 122 can generate display data formatted in accordance with a version of the DisplayPort protocol and transmit the display data to the DisplayPort sink through the MIO 120. The display controller 122 can generate display-agnostic data and provide the display-agnostic data to the programmable logic 112 via the interface 138. The display-agnostic data sink circuit 408 can be configured to access the display-agnostic data for processing. For example, the display-agnostic data sink circuit 408 can generate display data formatted in accordance with another protocol for consumption by the other display sink 111. Alternatively, the display-agnostic data sink circuit 408 can transmit the display-agnostic data to another circuit for processing.

In the examples described above, the display controller 122 is described as generated display data formatted in accordance with a version of the DisplayPort protocol. It is to be understood that the techniques described herein can be used with display controllers generating display data formatted according to other display protocols and thus such techniques are not limited to the DisplayPort protocol.

Figure 5:
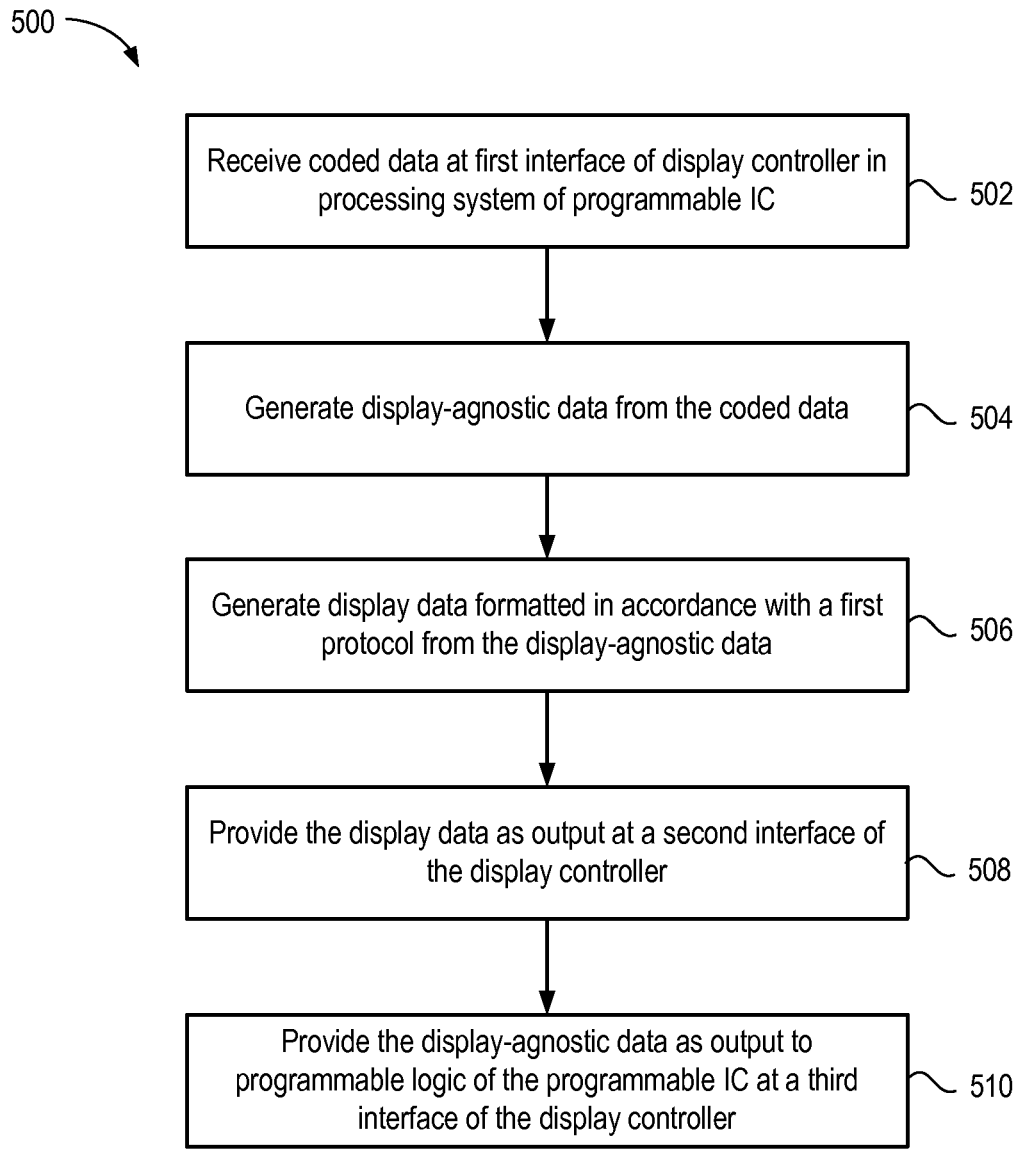
FIG. 5 is a flow diagram showing an example of a method of operating the display controller of FIG. 4.

FIG. 5 is a flow diagram showing an example of a method 500 of operating the display controller 122. The method 500 begins at step 502, where the display controller receives coded data at a first interface (e.g., the interface 320). At step 504, the display controller generates display-agnostic data from the coded data. At step 506, the display controller generates display data formatted in accordance with a first protocol from the display-agnostic data. At step 508, the display controller provides the display data as output via a second interface (e.g., the interface 324). At step 510, the display controller provides the display-agnostic data as output to the programmable logic at a third interface (e.g., the interface 138).

While the foregoing is directed to specific examples, other and further examples may be devised without departing from the basic scope thereof, and the scope thereof is determined by the claims that follow.

What is claimed is:

1. A programmable integrated circuit (IC), comprising:
   programmable logic; and
   a display controller having a first interface coupled to receive coded data, a renderer to generate display-agnostic data from the coded data, a transmitter to generate display data from the display-agnostic data in accordance with a first protocol, a second interface coupled to provide the display data as output, and a third interface coupled to provide the display-agnostic data to the programmable logic, wherein the first interface is coupled to receive at least a portion of the coded data from the programmable logic.

2. The programmable IC of claim 1, further comprising:
   at least one microprocessor;
   wherein the first interface is coupled to receive at least a portion of the coded data from a memory managed by the at least one microprocessor.

3. The programmable IC of claim 1, wherein the display controller is coupled to concurrently provide the display data as output via the second interface and the display-agnostic data to the programmable logic via the third interface.

4. The programmable IC of claim 1, wherein the first interface of the display controller comprises:
   a video interface coupled to the renderer;
   an audio interface coupled to the renderer; and
   a direct memory access (DMA) interface coupled to the renderer.

5. The programmable IC of claim 1, wherein the display-agnostic data comprises at least one of video data, graphics data, or audio data.

6. A system, comprising:
   a first display sink to receive first display data formatted in accordance with a first protocol; and
   a programmable integrated circuit (IC), coupled to the first display sink, the programmable IC comprising:
   programmable logic;
   a display controller having a first interface coupled to receive coded data, a renderer to generate display-agnostic data from the coded data, a first transmitter to generate the first display data from the display-agnostic data, a second interface coupled to provide the first display data as output, and a third interface coupled to provide the display-agnostic data to the programmable logic; and
   input/output (IO) circuits coupled to the second interface of the display controller to provide the first display data to the first display sink, wherein the first interface is coupled to receive at least a portion of the coded data from the programmable logic.

7. The system of claim 6, wherein the programmable logic includes a second transmitter, coupled to the third interface of the display controller, to generate second display data formatted in accordance with a second protocol different than the first protocol.

8. The system of claim 7, further comprising:
   a second display sink to receive the second display data from the second transmitter.

9. The system of claim 6, further comprising:
   a memory;
   wherein the programmable IC comprises at least one microprocessor to manage the memory; and
   wherein the first interface is coupled to receive at least a portion of the coded data from the memory.

10. The system of claim 6, wherein the programmable IC comprises:
    a processing system having the display controller;
    wherein the first interface is coupled to receive the coded data from the programmable logic and the processing system.

11. The system of claim 6, wherein the first interface of the display controller comprises:
    a video interface coupled to the renderer;
    an audio interface coupled to the renderer; and
    a direct memory access (DMA) interface coupled to the renderer.

12. The system of claim 6, wherein the display-agnostic data includes at least one of video data, graphics data, or audio data.

13. A method, comprising:
- receiving coded data at a first interface of a display controller in processing system of a programmable integrated circuit (IC);
- generating display-agnostic data from the coded data;
- generating display data formatted in accordance with a first protocol from the display-agnostic data;
- providing the display data as output at a second interface of the display controller; and
- providing the display-agnostic data as output to programmable logic of the programmable IC at a third interface of the display controller, wherein the coded data is received concurrently from the programmable logic and a memory managed by at least one microprocessor in the programmable IC.

14. The method of claim 13, wherein the display controller concurrently provides the display data as output and the display-agnostic data to the programmable logic.

15. The method of claim 13, wherein the coded data is received from at least one of: the programmable logic or a memory managed by at least one microprocessor in the programmable IC.

16. The method of claim 13, wherein the display-agnostic data includes at least one of video data, graphics data, or audio data.

17. A programmable integrated circuit (IC), comprising:
- programmable logic;
- a display controller having a first interface coupled to receive coded data, a renderer to generate display-agnostic data from the coded data, a transmitter to generate display data from the display-agnostic data in accordance with a first protocol, a second interface coupled to provide the display data as output, and a third interface coupled to provide the display-agnostic data to the programmable logic, wherein the first interface is coupled to receive at least a portion of the coded data from the programmable logic; and a processing system having the display controller,
wherein the first interface is coupled to receive the coded data from the programmable logic and the processing system.

18. The programmable IC of claim 17, wherein the display controller is coupled to concurrently provide the display data as output via the second interface and the display-agnostic data to the programmable logic via the third interface.

19. The programmable IC of claim 17, wherein the first interface of the display controller comprises:
- a video interface coupled to the renderer;
- an audio interface coupled to the renderer; and
- a direct memory access (DMA) interface coupled to the renderer.

20. The programmable IC of claim 17, wherein the display-agnostic data comprises at least one of video data, graphics data, or audio data.

* * * * *